US012689755B2

(12) United States Patent
Dey et al.

(10) Patent No.:  US 12,689,755 B2
(45) Date of Patent:       Jul. 21, 2026

(54) METHOD AND SYSTEM FOR A LOW-POWER LOSSLESS IMAGE COMPRESSION USING A SPIKING NEURAL NETWORK

(71) Applicant: Tata Consultancy Services Limited, Mumbai (IN)

(72) Inventors: Sounak Dey, Kolkata (IN); Chetan Sudhakar Kadway, Kolkata (IN); Arijit Mukherjee, Kolkata (IN); Arpan Pal, Kolkata (IN); Sayan Kahali, Kolkata (IN); Manan Suri, New Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 241 days.

(21) Appl. No.: 18/740,775

(22) Filed: Jun. 12, 2024

(65) Prior Publication Data

US 2024/0422334 A1      Dec. 19, 2024

(30) Foreign Application Priority Data

Jun. 15, 2023    (IN) .............................. 202321040920

(51) Int. Cl.
*H04N 19/42*           (2014.01)
*H04N 19/156*          (2014.01)
(Continued)

(52) U.S. Cl.
CPC ........... *H04N 19/42* (2014.11); *H04N 19/156* (2014.11); *H04N 19/17* (2014.11); *H04N 19/46* (2014.11); *H04N 19/91* (2014.11)

(58) Field of Classification Search
CPC ........ G06V 20/13; G06V 10/82; G06V 20/17; G06V 10/50; G06T 2207/10032; G06T 2207/20021
See application file for complete search history.

(56) References Cited

U.S. PATENT DOCUMENTS 8,977,582 B2    3/2015  Richert
11,221,990 B2   1/2022  Taylor, Jr. et al.

OTHER PUBLICATIONS

Yan, Zhanglu, Jun Zhou, and Weng-Fai Wong. "Near lossless transfer learning for spiking neural networks." Proceedings of the AAAI conference on artificial intelligence. vol. 35. No. 12. 2021. (Year: 2021).*

(Continued)

*Primary Examiner* — Raphael Schwartz

(74) *Attorney, Agent, or Firm* — Finnegan, Henderson, Farabow, Garrett & Dunner, LLP

(57)            ABSTRACT

This disclosure relates generally to reducing earth-bound image volume with an efficient lossless compression technique. The embodiment thus provides a method and system for reducing earth-bound image volume based on a Spiking Neural Network (SNN) model. Moreover, the embodiments herein further provide a complete lossless compression framework comprises of a SNN-based Density Estimator (DE) followed by a classical Arithmetic Encoder (AE). The SNN model is used to obtain residual errors which are compressed by AE and thereafter transmitted to the receiving station. While reducing the power consumption during transmission by similar percentages, the system also saves in-situ computation power as it uses SNN based DE compared to its Deep Neural Network (DNN) counterpart. The SNN model has a lower memory footprint compared to a corresponding Arithmetic Neural Network (ANN) model and lower latency, which exactly fit the requirement for on-board computation in small satellite.

12 Claims, 10 Drawing Sheets

(51) Int. Cl.
*H04N 19/17*     (2014.01)
*H04N 19/46*     (2014.01)
*H04N 19/91*     (2014.01)

(56)        References Cited

OTHER PUBLICATIONS

Liu, Yanchen, et al. "Application of deep compression technique in spiking neural network chip." IEEE transactions on biomedical circuits and systems 14.2 (2019): 274-282. (Year: 2019).*
Abderrahmane, Nassim, et al. "SPLEAT: SPiking Low-power Event-based ArchiTecture for in-orbit processing of satellite imagery." 2022 International Joint Conference on Neural Networks (IJCNN). IEEE, 2022. (Year: 2022).*
Incetaş, "Image Interpolation Based on Spiking Neural Network Model," Appl. Sci. 13 (2023).

* cited by examiner

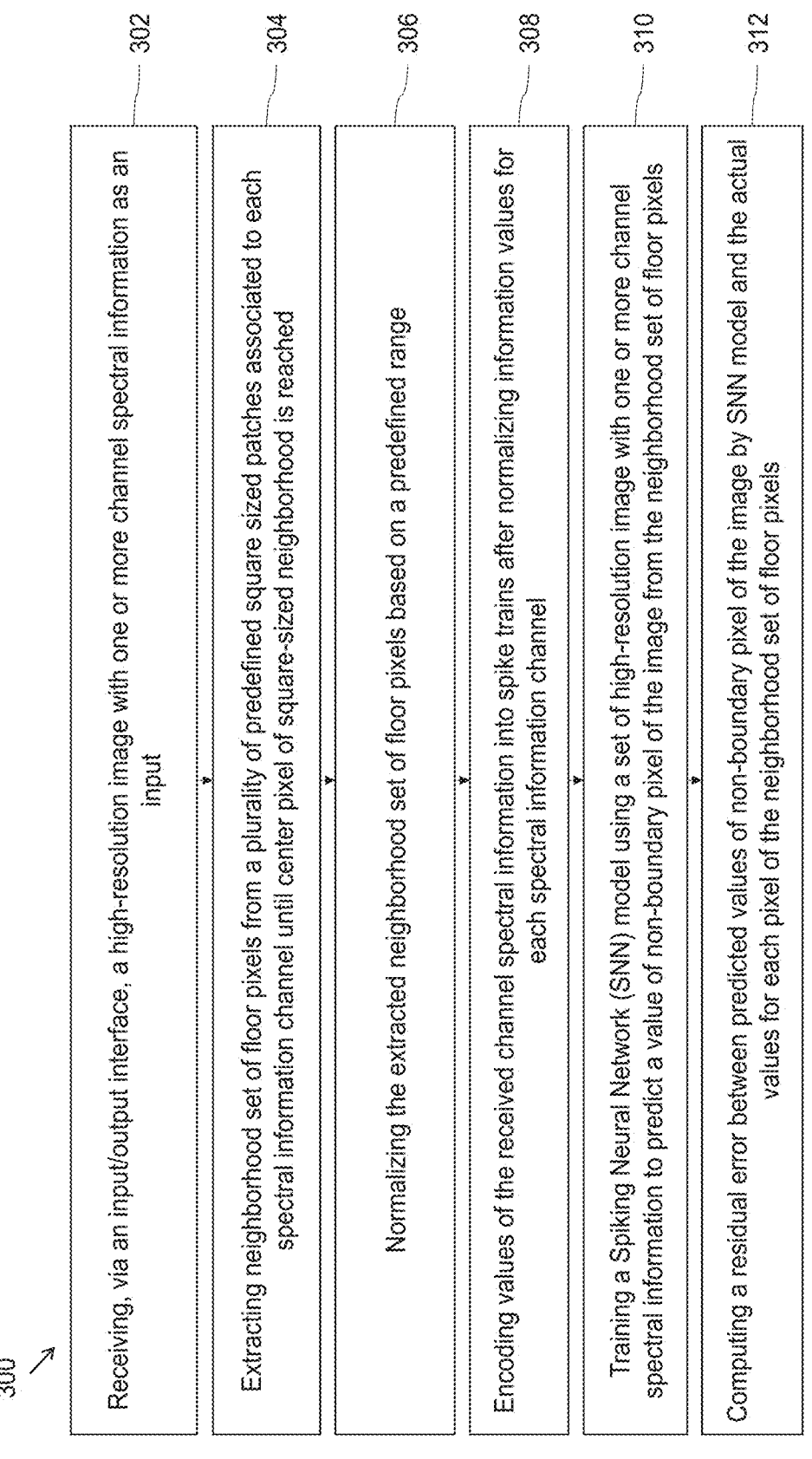

300

Receiving, via an input/output interface, a high-resolution image with one or more channel spectral information as an input — 302

Extracting neighborhood set of floor pixels from a plurality of predefined square sized patches associated to each spectral information channel until center pixel of square-sized neighborhood is reached — 304

Normalizing the extracted neighborhood set of floor pixels based on a predefined range — 306

Encoding values of the received channel spectral information into spike trains after normalizing information values for each spectral information channel — 308

Training a Spiking Neural Network (SNN) model using a set of high-resolution image with one or more channel spectral information to predict a value of non-boundary pixel of the image from the neighborhood set of floor pixels — 310

Computing a residual error between predicted values of non-boundary pixel of the image by SNN model and the actual values for each pixel of the neighborhood set of floor pixels — 312

FIG. 3A

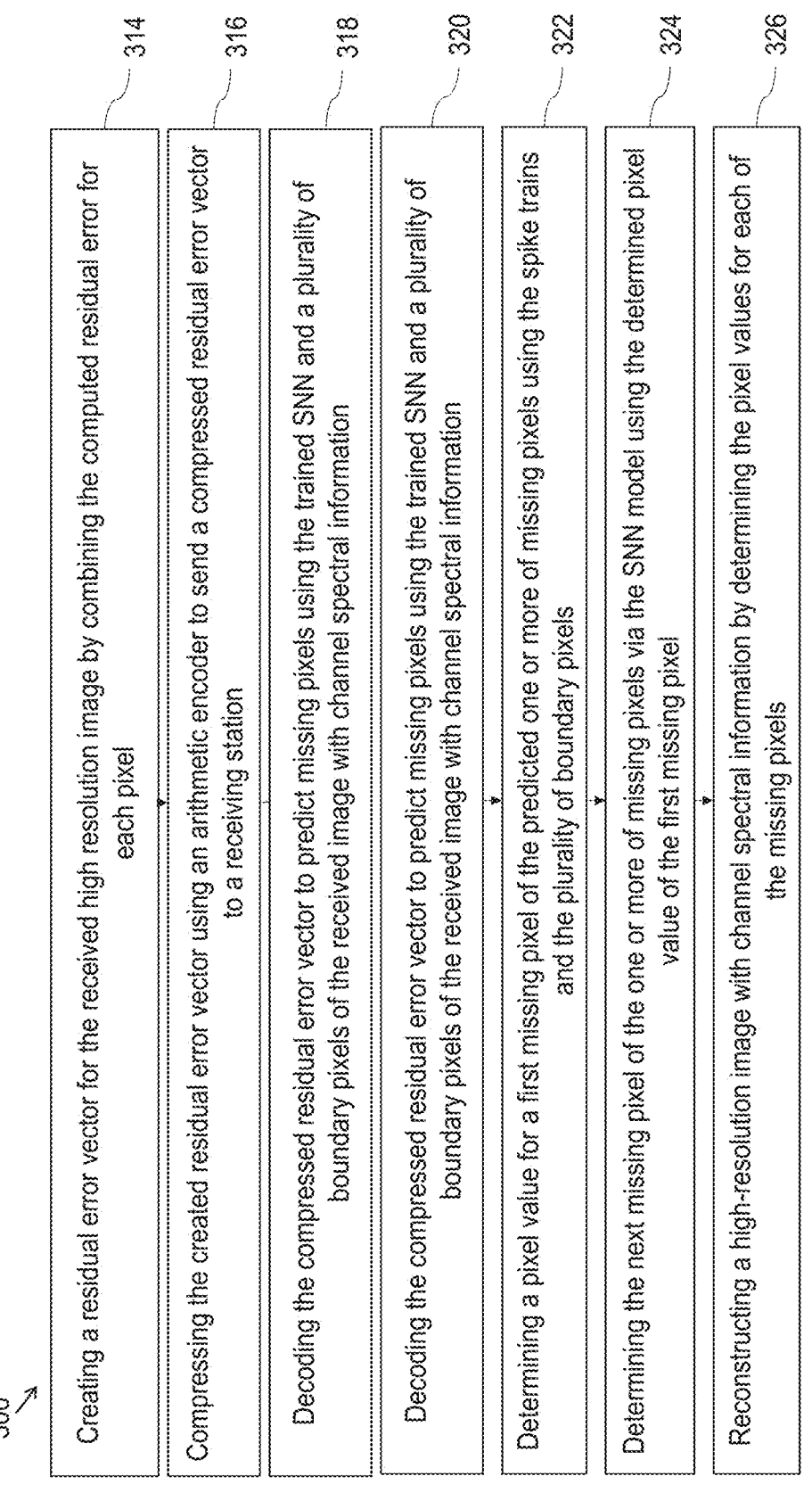

300

314 — Creating a residual error vector for the received high resolution image by combining the computed residual error for each pixel 316 — Compressing the created residual error vector using an arithmetic encoder to send a compressed residual error vector to a receiving station 318 — Decoding the compressed residual error vector to predict missing pixels using the trained SNN and a plurality of boundary pixels of the received image with channel spectral information 320 — Decoding the compressed residual error vector to predict missing pixels using the trained SNN and a plurality of boundary pixels of the received image with channel spectral information 322 — Determining a pixel value for a first missing pixel of the predicted one or more of missing pixels using the spike trains and the plurality of boundary pixels 324 — Determining the next missing pixel of the one or more of missing pixels via the SNN model using the determined pixel value of the first missing pixel 326 — Reconstructing a high-resolution image with channel spectral information by determining the pixel values for each of the missing pixels

FIG. 3B

METHOD AND SYSTEM FOR A LOW-POWER LOSSLESS IMAGE COMPRESSION USING A SPIKING NEURAL NETWORK

CROSS-REFERENCE TO RELATED APPLICATIONS AND PRIORITY

This U.S. patent application claims priority under 35 U.S.C. § 119 to Indian Application number 202321040920, filed on Jun. 15, 2023. The entire content of the abovementioned application is incorporated herein by reference.

TECHNICAL FIELD

The disclosure herein generally relates to the field of image compression, and, more particularly, to a method and system for reducing earth-bound image volume with an efficient lossless compression technique that is based on a highly energy efficient neural network.

BACKGROUND

Emergence of small remote sensing satellites has radically changed the landscape of space applications by enabling commercial organizations to launch Low Earth Orbit (LEO) CubeSat constellations for various earth observation missions such as weather monitoring, disaster monitoring, precision agriculture etc. Generally, LEO satellites are extremely constrained in terms of memory, computing resource and power so that they are unable carry out even low-scale analytics on captured earth observation images. High resolution large (in the order of GBs) images are usually sent to receiving stations for further analysis, such as, segmentation, object detection, classification etc. However, the limited line-of-sight window for satellites in low orbit, large downstream data volume and high-power requirement for transmission often jeopardize this earth-bound communication and delay the overall task of earth observation.

Orbital Edge Computing (OEC) is a recent approach that enables sensed data to be processed on-board to generate real-time alerts, thereby improving application latency. However, due to size and weight restrictions, these small satellites cannot carry large batteries or solar panels resulting in inadequate power supply at the same time, these satellites cannot carry large computing platforms either since such platforms are power hungry or are often heavy. These limitations have, to a large extent, adversely affected implementations of OEC.

Existing systems and methods are illustrating two paths, firstly, ways to reduce the size, weight and power requirements of the hardware that can be put on-board, and secondly, ways to reduce the downstream data volume (various types of high-resolution images and other sensed data) by different compression techniques that may consume less power. However, Lossy image compression techniques can reduce the data volume effectively, but these also introduce noise artefacts and lose image details resulting in poor observation results.

SUMMARY

Embodiments of the present disclosure present technological improvements as solutions to one or more of the above-mentioned technical problems recognized by the inventors in conventional systems. For example, in one embodiment, a method for reducing earth-bound image volume with an efficient lossless compression technique that is based on a highly energy efficient neural network is provided. The processor-implemented method includes receiving, via an input/output interface, a high-resolution image with one or more channel spectral information as an input, wherein the one or more channel spectral information comprising a plurality of predefined square sized patches. Further, the processor-implemented method comprises extracting a plurality of neighborhood pixels from rows above center pixel and immediate left pixels of the center pixel in the patch from each of the plurality of predefined square sized patches associated to each spectral information channel. The extracted one or more neighborhood pixels are normalized based on a predefined range. Furthermore, the processor-implemented method comprises encoding values of the received one or more channel spectral information into one or more spike trains after normalizing information values for each spectral information channel and training a Spiking Neural Network (SNN) model using a set of received high resolution images with one or more channel spectral information to predict values of one or more non-boundary pixels of the image from the plurality of neighborhood pixels.

Further, the processor-implemented method comprises computing a residual error between predicted values of one or more non-boundary pixels of the image by SNN model and the actual values for each pixel of the plurality of neighborhood pixels and creating a residual error vector for the received high resolution image by combining the computed residual error for each pixel. Furthermore, the processor-implemented method comprises compressing the created residual error vector using a classical Arithmetic Encoder (AE) to send a compressed residual error vector along with a plurality of boundary pixels of the received high resolution image to a receiving station and predicting one or more missing pixels using the plurality of boundary pixels of the received high resolution image. Further, the processor-implemented method comprises decoding the compressed residual error vector using an arithmetic decoder. Furthermore, the processor-implemented method comprises determining a pixel value for a first missing pixel of the predicted one or more missing pixels using the spike trains and the plurality of boundary pixels and determining the next missing pixel of the one or more missing pixels via the SNN model using the determined pixel value of the first missing pixel. The prediction of next missing pixel continues till each of the one or more missing pixels are predicted. Finally, a high-resolution image with one or more channel spectral information is reconstructed by determining the pixel values for each of the one or more missing pixels.

In another aspect, a system for reducing earth-bound image volume with an efficient lossless compression technique is provided. The system comprises a memory storing a plurality of instructions and one or more Input/Output (I/O) interfaces to receive a high-resolution image with one or more channel spectral information as an input. The one or more channel spectral information comprising a plurality of predefined square sized patches. Further, the system comprises one or more hardware processors coupled to the memory via the one or more I/O interfaces, wherein the one or more hardware processors are configured by the instructions to execute the plurality of instructions stored in the at least one memory.

Further, the system is configured to extract a plurality of neighborhood pixels from rows above center pixel and immediate left pixels of the center pixel in the patch from each of the plurality of predefined square sized patches associated to each spectral information channel. The extracted one or more neighborhood pixels are normalized based on a predefined range. Furthermore, the one or more hardware processors are configured by the instructions to encode values of the received one or more channel spectral information into one or more spike trains after normalizing information values for each spectral information channel and training a Spiking Neural Network (SNN) model using a set of received high resolution images with one or more channel spectral information to predict values of one or more non-boundary pixels of the image from the plurality of neighborhood pixels.

Further, the one or more hardware processors are configured by the instructions to compute a residual error between predicted values of one or more non-boundary pixels of the image by SNN model and the actual values for each pixel of the plurality of neighborhood pixels and create a residual error vector for the received high resolution image by combining the computed residual error for each pixel. Furthermore, the one or more hardware processors are configured by the instructions to compress the created residual error vector using a classical Arithmetic Encoder (AE) to send a compressed residual error vector along with a plurality of boundary pixels of the received high resolution image to a receiving station and predicting one or more missing pixels using the plurality of boundary pixels of the received high resolution image. Further, the one or more hardware processors are configured by the instructions to decode the compressed residual error vector using an arithmetic decoder. Furthermore, the one or more hardware processors are configured by the instructions to determine a pixel value for a first missing pixel of the predicted one or more missing pixels using the spike trains and the plurality of boundary pixels and determine the next missing pixel of the one or more missing pixels via the SNN model using the determined pixel value of the first missing pixel. The prediction of next missing pixel continues till each of the one or more missing pixels are predicted. Finally, a high-resolution image with one or more channel spectral information is reconstructed by determining the pixel values for each of the one or more missing pixels.

In yet another aspect, there are provided one or more non-transitory machine-readable information storage mediums comprising one or more instructions, which when executed by one or more hardware processors causes a method for a low-power lossless image compression using a Spiking Neural Network (SNN) is provided. The processor-implemented method includes receiving, via an input/output interface, a high-resolution image with one or more channel spectral information as an input, wherein the one or more channel spectral information comprising a plurality of predefined square sized patches. Further, the processor-implemented method comprises extracting a plurality of neighborhood pixels from rows above center pixel and immediate left pixels of the center pixel in the patch from each of the plurality of predefined square sized patches associated to each spectral information channel. The extracted one or more neighborhood pixels are normalized based on a predefined range. Furthermore, the processor-implemented method comprises encoding values of the received one or more channel spectral information into one or more spike trains after normalizing information values for each spectral information channel and training a Spiking Neural Network (SNN) model using a set of received high resolution images with one or more channel spectral information to predict values of one or more non-boundary pixels of the image from the plurality of neighborhood pixels.

Further, the processor-implemented method comprises computing a residual error between predicted values of one or more non-boundary pixels of the image by SNN model and the actual values for each pixel of the plurality of neighborhood pixels and creating a residual error vector for the received high resolution image by combining the computed residual error for each pixel. Furthermore, the processor-implemented method comprises compressing the created residual error vector using a classical Arithmetic Encoder (AE) to send a compressed residual error vector along with a plurality of boundary pixels of the received high resolution image to a receiving station and predicting one or more missing pixels using the plurality of boundary pixels of the received high resolution image. Further, the processor-implemented method comprises decoding the compressed residual error vector using an arithmetic decoder. Furthermore, the processor-implemented method comprises determining a pixel value for a first missing pixel of the predicted one or more missing pixels using the spike trains and the plurality of boundary pixels and determining the next missing pixel of the one or more missing pixels via the SNN model using the determined pixel value of the first missing pixel. The prediction of next missing pixel continues till each of the one or more missing pixels are predicted. Finally, a high-resolution image with one or more channel spectral information is reconstructed by determining the pixel values for each of the one or more missing pixels.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A and 3B (collectively referred as FIG. 3) is an exemplary flow diagram illustrating a processor-implemented method for a low-power lossless image compression using a Spiking Neural Network (SNN) implemented by the system of FIG. 1, in accordance with some embodiments of the present disclosure.

DETAILED DESCRIPTION OF EMBODIMENTS

Figure 1:
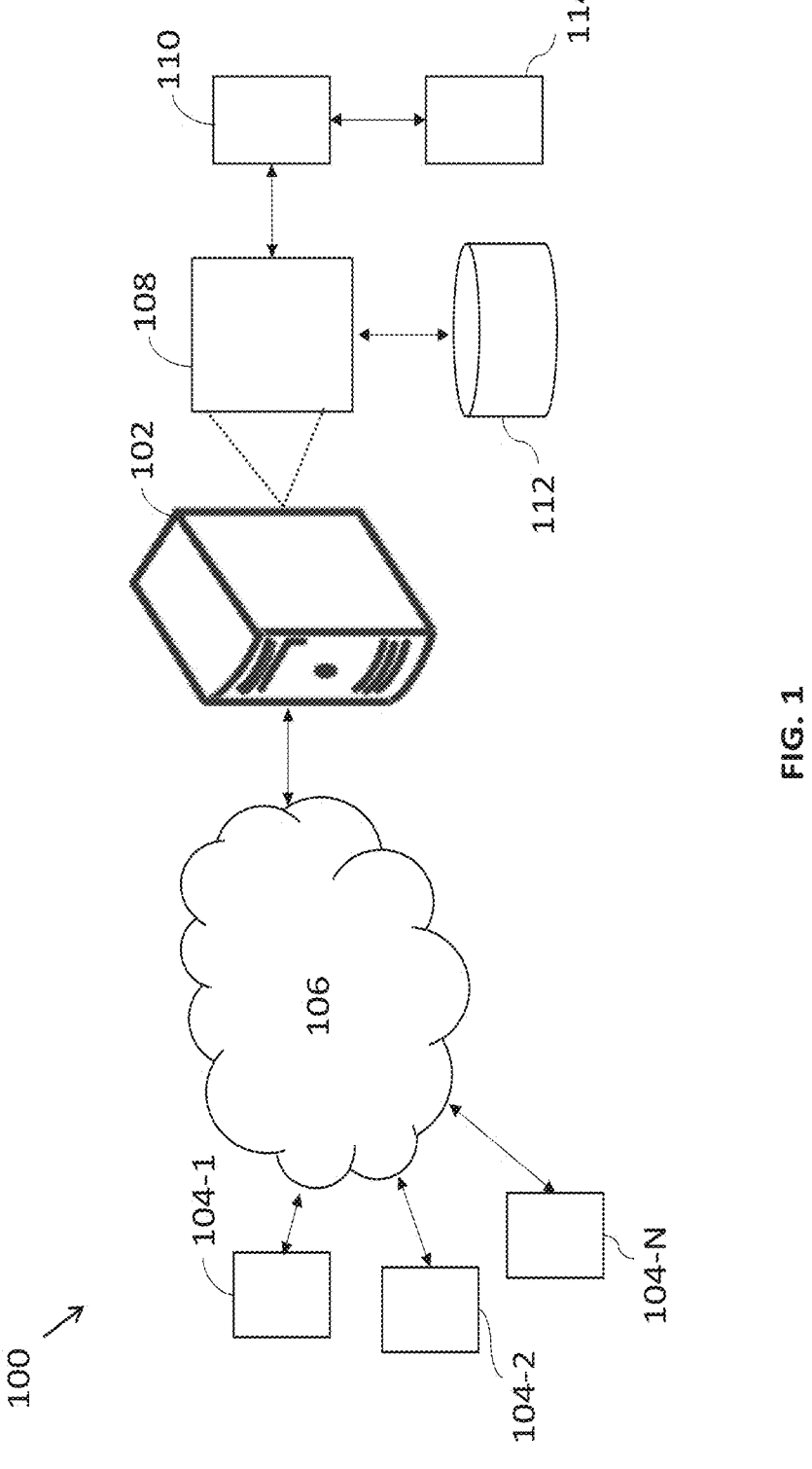
FIG. 1 illustrates an exemplary system for reducing earth-bound image volume with an efficient lossless compression technique that is based on a highly energy efficient neural network, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

It would be appreciated that the lossless image compression techniques enable reconstruction of the image data without incurring any loss of information, thus significantly reducing the downstream data volume during space-to-ground data transmission. Large multi-layer Deep Neural Network (DNN) based solutions are found to achieve high compression ratio. In the DNN based flow, there is usually a Density Estimator (DE) block that learns to predict the pixels of input image patches, followed by an Arithmetic Encoder (AE) block that encodes the residual error (between original and predicted pixel values) and finally sends it as downstream data to the receiving station. This Density Estimator is usually designed either as a fully connected network or as a Recurrent Neural Network (RNN) such as LSTM. However, DNNs incur the cost of large memory and power requirements thus making them unfit for running on-board LEO satellites.

The lossless compression n techniques can broadly be categorized as follows: (i) Prediction-based, (ii) Transform-based, (iii) Vector Quantization-based, and (iv) Deep Learning based techniques. Several recent deep learning-based methods address the requirement for lossless image compression. Learning-based lossless image compression techniques use autoregressive models. The current approach follows a two-step method, a density estimator model followed by a conventional encoder such as, Arithmetic Encoder (AE), Lempel-Ziv-Markov Chain Algorithm (LZMA) encoder etc. Density estimator models learn to predict the pixel values of the input image. These can be further categorized into fully connected neural network and recurrent neural network such as DeepZip, and hierarchical probabilistic models that can learn both image distribution and its auxiliary representations (L3C). Another approach employs deep learning based frameworks as predictors to estimate the residuals which substantially improve the prediction accuracy compared to other prediction-based methods. These residual errors are then encoded using a novel context-tree-based biplane codec.

Other prior arts provide a compression method by means of a Convolutional Neural Network (CNN) to learn a compact representation of the original image and then encode it using the Lempel-Ziv Markov chain algorithm. The encoded image is reconstructed at the receiver end with the same quality as that of the original image. A learning-based predictive model is created for lossless image compression. These models offer voxel-wise prediction and train MLP and LSTM models, respectively. Predictions obtained by these models are used for calculating the residual error which are encoded by the arithmetic encoder.

Embodiments herein provide a method and system for reducing an earth-bound image volume with an efficient lossless compression technique that is based on a highly energy efficient neural network approach known as Spiking Neural Network (SNN). SNN, a $3^{rd}$ generation Artificial Intelligence (AI) paradigm, achieves at least 100× power benefit while running on Neuromorphic computing platforms. The Neuromorphic computing platforms follow a non-Von Neumann architecture closely mimicking the functionality of mammalian brain. Owing to collocation of compute and memory at neurons and synapses of a neuromorphic processor and the event based sparse asynchronous data processing, SNN running on neuromorphic platforms are less computationally intensive, thereby making them a suitable candidate for on-board processing in LEO satellites.

In another aspect, the classical DNN based Density Estimator is replaced with a corresponding SNN version. In the present disclosure, the complete lossless compression framework comprises of a SNN based Density Estimator (DE) followed by a classical Arithmetic Encoder (AE). The SNN model is used to obtain residual errors (difference between SNN predicted image pixels and the ground truth image pixels) which are compressed by AE and thereafter transmitted to the receiving station.

Referring now to the drawings, and more particularly to FIG. 1 through FIG. 8D, where similar reference characters denote corresponding features consistently throughout the figures, there are shown preferred embodiments and these embodiments are described in the context of the following exemplary system and/or method.

FIG. 1 illustrates a block diagram of a system 100 for reducing earth-bound image volume with an efficient lossless compression technique that is based on a highly energy efficient neural network, in accordance with an example embodiment. Although the present disclosure is explained considering that the system 100 is implemented on a server, it may be understood that the system 100 may comprise one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 supports various connectivity options such as BLUETOOTH®, USB, ZigBee, and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. Further, the system 100 comprises at least one memory with a plurality of instructions, one or more databases 112, and one or more hardware processors 108 which are communicatively coupled with the at least one memory to execute a plurality of modules 114 therein. The components and functionalities of the system 100 are described further in detail.

Figure 2:
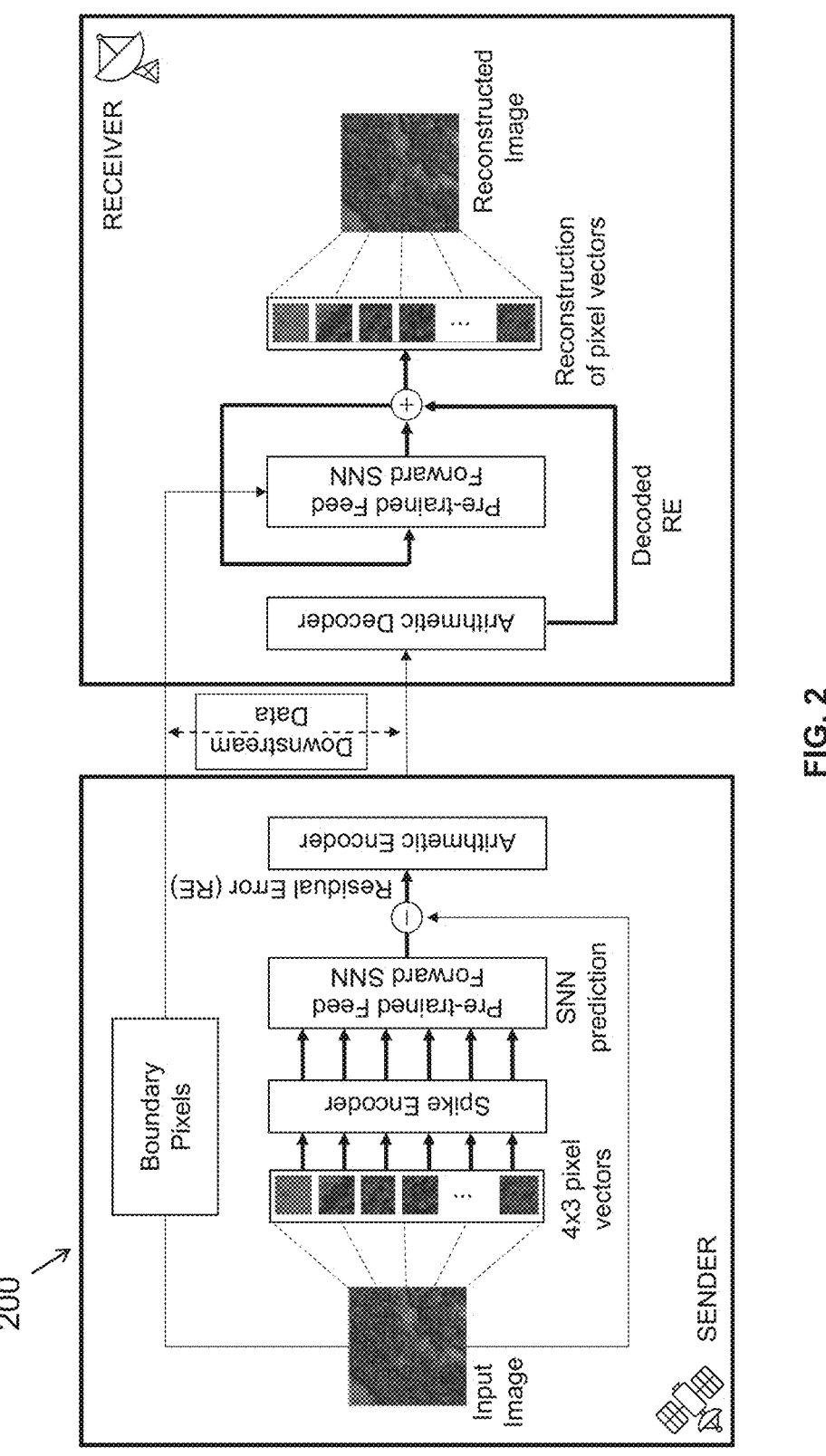
FIG. 2 is a functional block diagram to illustrate a low-power lossless image compression using a Spiking Neural Network (SNN), in accordance with some embodiments of the present disclosure.

FIG. 2 is an exemplary flow diagram illustrating a low-power lossless image compression using a Spiking Neural Network (SNN) implemented by the system 100 of FIG. 1. The workflow is divided into two main functional blocks, namely the sender i.e., the satellite and the receiver i.e., a ground station. The sender comprises of three main image components (i) a Spike Encoder for encoding real-valued image data into spikes, (ii) a Feed-forward Spiking Neural Network (SNN) for actual data processing, and (iii) an arithmetic Encoder for encoding the image data. The receiver block also comprises of the same pre-trained SNN model along with the corresponding arithmetic decoder.

There are different spike encoding schemes such as rate encoding, temporal encoding, phase encoding etc. Rate encoding and direct encoding techniques are well suited for SNN while processing large dataset on constrained edge devices such as satellite. In the process, the RGB values of the image pixels are encoded into spike trains. The range of RGB values for each channel lies within 0-255.

The Rate encoding is robust and more energy efficient than direct encoding technique. The direct encoding becomes more advantageous than rate encoding when number of layers in networks increases, and the dataset is larger. Moreover, the direct encoding performs better than date encoding where the input spikes are generated based on the pixel intensity. As the weights of the input coding layer are trained during direct encoding mechanism, the input pixels are converted into an optimal spike train.

An arithmetic coding is a popular compression technique that is used in a variety of lossless compression applications. In arithmetic coding, the arithmetic encoder encodes a message as an interval of numbers between 0 and 1. Successive symbols in the message reduces the interval size in accordance with the probabilities of the symbol generated by the model.

FIGS. 3A and 3B (collectively referred as FIG. 3) is a flow diagram illustrating a processor-implemented method 300 for a low-power lossless image compression using a Spiking Neural Network (SNN) implemented by the system 100 of FIG. 1. Functions of the components of the system 100 are now explained with reference to FIG. 2 through steps of flow diagram in FIG. 3, according to some embodiments of the present disclosure.

Initially, at step 302 of the processor-implemented method 300, the one or more hardware processors 108 are configured by the programmed instructions to receive, via an input/output interface, a high-resolution image with one or more channel spectral information as an input. The one or more channel spectral information comprising a plurality of predefined square sized patches. The images can be multi-channel (RGB/MSI/SAR). The square sized patches can be any of odd value such as 3×3, 5×5, 7×7, and 11×11.

At the next step 304 of the processor-implemented method 300, the one or more hardware processors 108 are configured by the programmed instructions to extract a plurality of neighborhood pixels from each of the plurality of predefined square sized patches associated to each spectral information channel. Wherein the plurality of neighborhood pixels is extracted from rows above a center pixel and immediate left pixels of the center pixel in each predefined square sized patch. Every non-boundary image pixel can be successfully predicted as $\hat{y}_{i,j}$ based on the values of the neighborhood quartet (four neighboring pixels) with pixel values $(y_{i-1,j-1}, y_{i-1,j}, y_{i-1,j+1}, y_{i,j-1})$.

At the next step 306 of the processor-implemented method 300, the one or more hardware processors 108 are configured by the programmed instructions to normalize the extracted plurality of neighborhood pixels based on a predefined range.

At the next step 308 of the method 300, the one or more hardware processors 108 are configured by the programmed instructions to encode values of the received one or more channel spectral information into one or more spike trains after normalizing information values for each spectral information channel. It is to be noted that the SNNs work in a spike domain. Any real valued input to the model must be converted into spike trains before being consumed by the SNN. There are different spike encoding schemes such as rate encoding, temporal encoding, phase encoding etc.

In one illustration, Red-Green-Blue (RGB) values of image pixels are encoded into spike trains. The range of RGB values for each channel lies within 0-255 and they are normalized by the maximum value (i.e., 255) before encoding.

At the next step 310 of the method 300, the one or more hardware processors 108 are configured by the programmed instructions to train a Spiking Neural Network (SNN) model using a set of received high resolution images with one or more channel spectral information to predict values of one or more non-boundary pixels of the image from the plurality of neighborhood pixels. The main objective of the SNN is to learn a mapping function that can predict target pixels from a given quartet of input pixels. A sliding window mechanism with this quartet helps the SNN train on every pixel of an image for training set.

Figure 4:
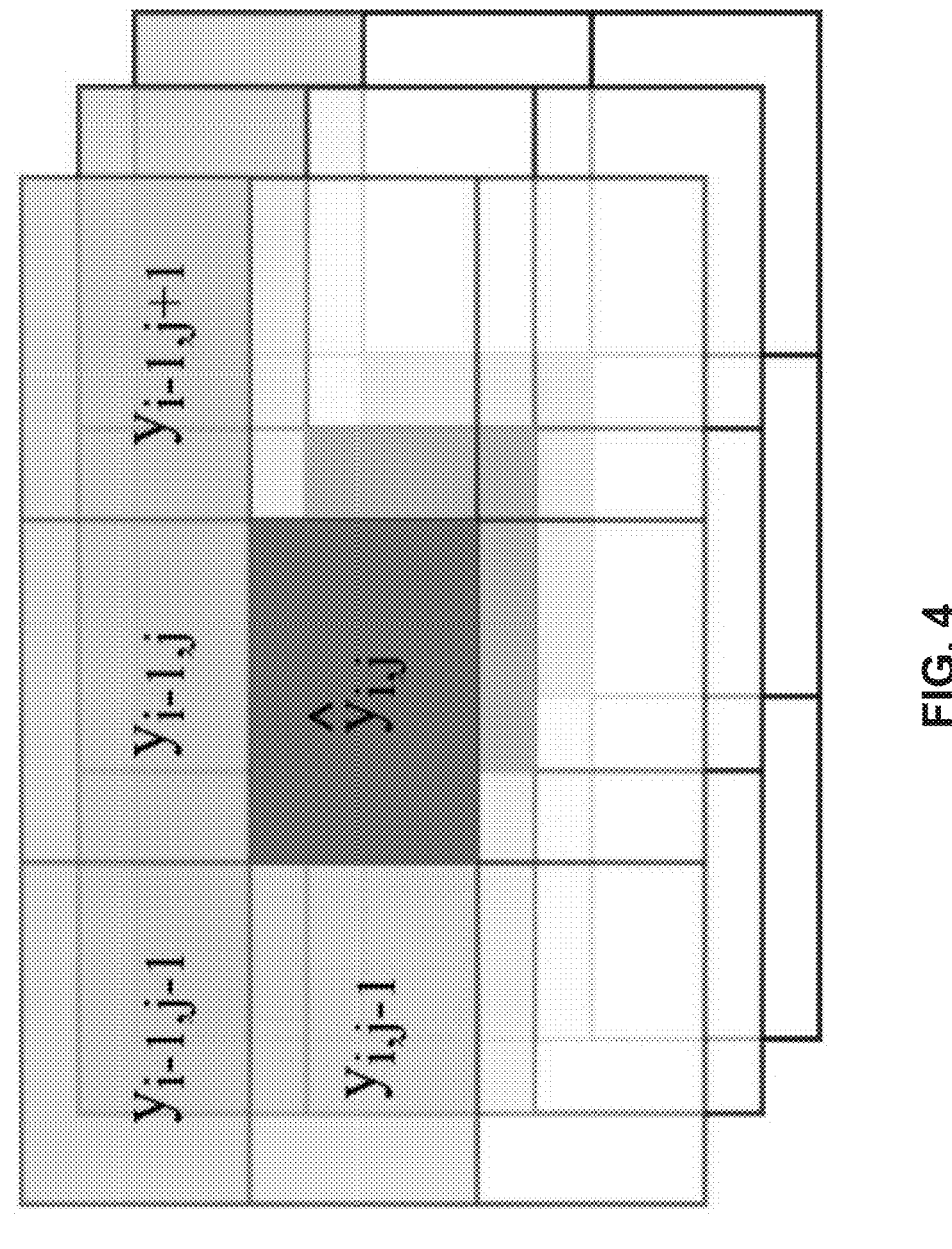
FIG. 4 is a schematic diagram illustrating three channels for a neighborhood quartet of a given target pixel with predicted value for each color channel in accordance with some embodiments of the present disclosure.

FIG. 4 illustrates a neighborhood quartet of a given target pixel with predicted value for each color channel in accordance with some embodiments of the present disclosure. Considering a quartet for each color channel of RGB, $N_i$ the number of neuron input neurons in the trained SNN is 12. Value of $N_h$, number of neurons in the hidden layer, is subject to performance tuning and is taken as 100. An empirical loss is minimized over the training set of each image:

$$L = \frac{\sum_{i=1}^{n} y - \hat{y}v}{n} \tag{1}$$

wherein, y is the ground truth value of $i^{th}$ pixel while $\hat{y}$ is the neuron membrane potential and n are total number of data samples. The SNN is trained to minimize the residual error ($\mathfrak{R} = y - \hat{y}$) for each pixel. The compression ratio is inversely proportional to RE.

Figure 5:
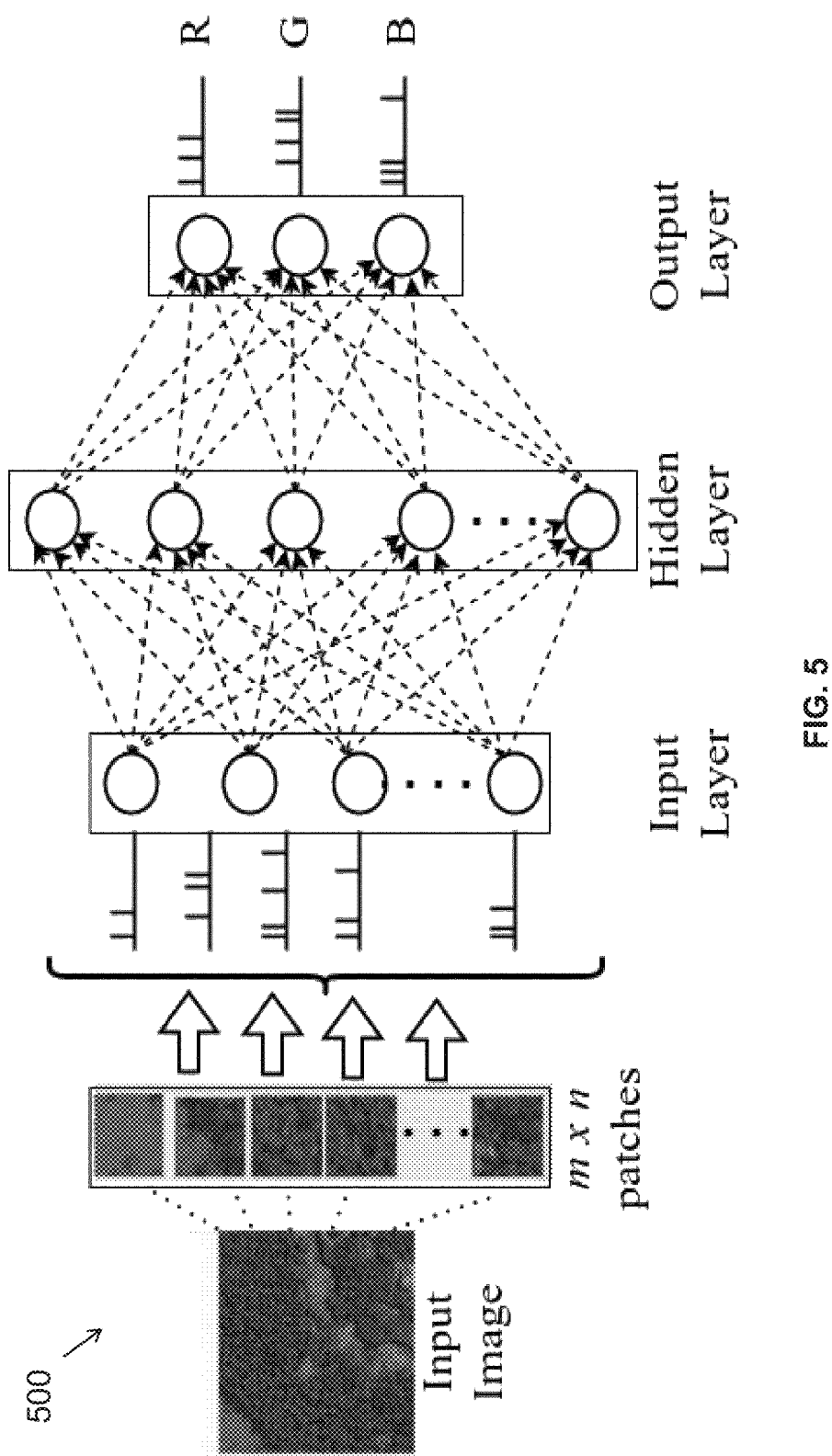
FIG. 5 is a schematic diagram illustrating a feed-forward Spiking Neural Network (SNN) in accordance with some embodiments of the present disclosure.

FIG. 5 is a schematic diagram illustrating a feed-forward Spiking Neural Network (SNN) in accordance with some embodiments of the present disclosure. The SNN is trained using a Deep Globe Land Cover (DGLC) and Signal and Image Processing Institute (USC-SIPI) datasets. From the DGLC dataset, 31 satellite images with dimensions 2448× 2448 pixels have been selected out of which 25 images are used for training and 6 images are used for testing. The SIPI dataset comprises of 25 aerial images with dimensions 1024×1024 pixels from where 19 images are used for training and remaining 6 for testing.

In one aspect, the encoded spike trains are consumed by the network that follows a spike encoder module. A spiking feed-forward neural network is designed, where each layer comprises of a leaky integrate and fire (LIF) neurons. The equation for LIF neuron is expressed below:

$$\tau_m \frac{dV}{dt} = (V_{rest} - V) + IR \qquad (2)$$

$$s = \begin{cases} 1, & V \geq V_{thresh} \\ 0, & V < V_{thresh} \end{cases}$$

wherein, V is the neuron membrane potential, $V_{thresh}$ is the threshold membrane potential, $V_{rest}$ is resting membrane potential, $\tau_m$ denotes the membrane potential decay factor, I is total input current and R is the total effective resistance. This feed forward SNN has three layers named input, hidden, and output having $N_i$, $N_h$, $N_o$ number of neurons respectively.

At the next step 312 of the method 300, the one or more hardware processors 108 are configured by the programmed instructions to compute a residual error between predicted values of one or more non-boundary pixels of the image by SNN model and the actual values for each pixel of the plurality of neighborhood pixels.

Further, the trained SNN model is used to predict value of every non-boundary pixel $\hat{y}_{i,j}$ of the given image from its neighborhood quartet and compute the residual error for each pixel as ($\Re = y - \hat{y}$), wherein y is the actual value of a pixel. This pre-trained SNN model is used at the satellite to populate the complete matrix of residual errors for the entire image, except that during this process, the real values of each pixel in the neighborhood quartet are used.

At the next step 314 of the method 300, the one or more hardware processors 108 are configured by the programmed instructions to create a residual error vector for the received high resolution image by combining the computed residual error for each pixel.

At the next step 316 of the method 300, the one or more hardware processors 108 are configured by the programmed instructions to compress the created residual error vector using a classical Arithmetic Encoder (AE) to send a compressed residual error vector along with a plurality of boundary pixels of the received high resolution image to a receiving station.

At the next step 318 of the method 300, the one or more hardware processors 108 are configured by the programmed instructions to predict one or more missing pixels using the plurality of boundary pixels of the received high resolution image.

Figure 6:
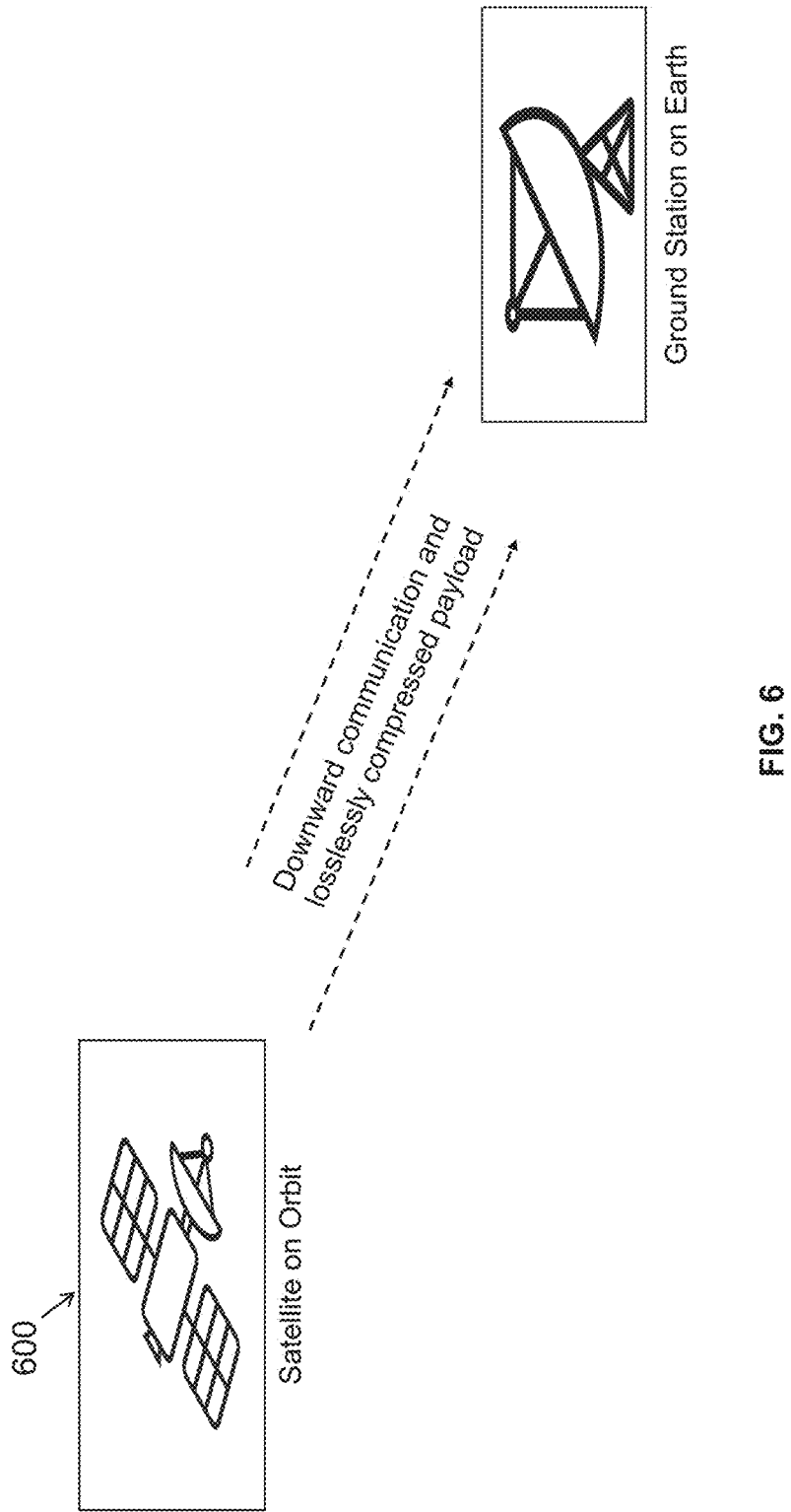
FIG. 6 is a schematic diagram illustrating the SNN based lossless compression framework as a system workflow, in accordance with some embodiments of the present disclosure.

At the next step 320 of the method 300, the one or more hardware processors 108 are configured by the programmed instructions to decode the compressed residual error vector using an arithmetic decoder, wherein the decoded compressed residual error vector is added to the predicted one or more missing pixels using the trained SNN to obtain original pixels. A compressed message containing the residual error matrix is sent along with the boundary pixels of the image as downstream data to the ground station as shown in FIG. 6. At the receiving end, the message containing the residual errors is decompressed and together with the boundary pixels, a replica SNN model reconstructs the image by predicting the values of each non-boundary pixel. Unlike the processing at the satellite, the actual values of the non-boundary pixels are not known at the receiving end, and the prediction process is cumulative in nature.

At the next step 322 of the method 300, the one or more hardware processors 108 are configured by the programmed instructions to determine a pixel value for a first missing pixel of the predicted one or more missing pixels using the spike trains and the plurality of boundary pixels.

At the next step 324 of the method 300, the one or more hardware processors 108 are configured by the programmed instructions to determine the next missing pixel of the one or more missing pixels via the SNN model using the determined pixel value of the first missing pixel, wherein the prediction of next missing pixel continues till each of the one or more missing pixels are predicted.

Finally, at the last step 326 of the method 300, the one or more hardware processors 108 are configured by the programmed instructions to a high-resolution image with one or more channel spectral information by determining the pixel values for each of the one or more missing pixels.

Figure 7:
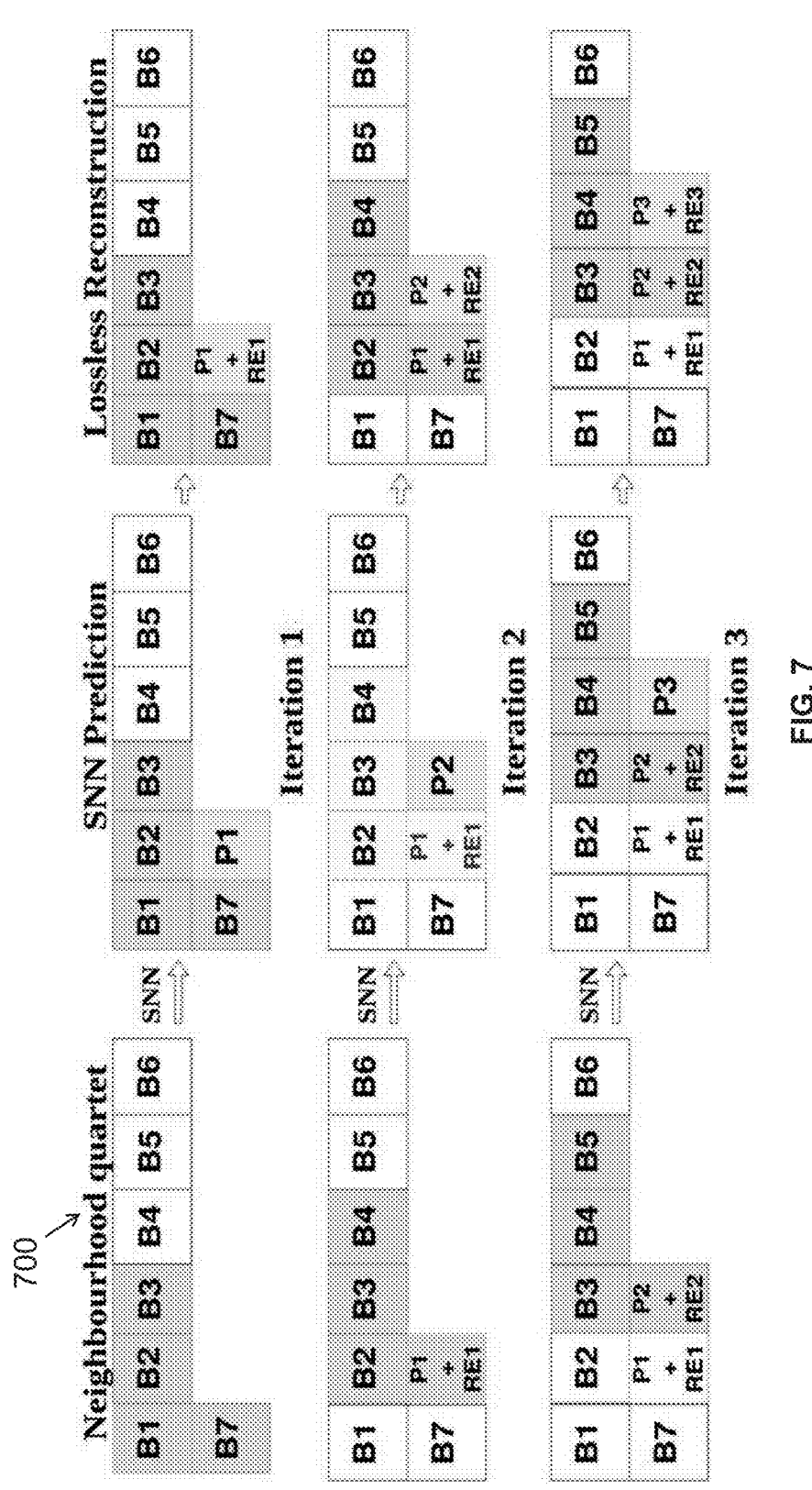
FIG. 7 is a schematic diagram illustrating iterations of pixel prediction using a sliding window mechanism on the neighborhood quartets in accordance with some embodiments of the present disclosure.

FIG. 7 is a schematic diagram illustrating a feed-forward Spiking Neural Network (SNN) in accordance with some embodiments of the present disclosure. It shows as an example of lossless reconstruction at the receiving end. There are three iterations of pixel prediction using a sliding window mechanism on the neighborhood quartets. In first iteration, the neighborhood quartet (B1, B2, B3, B7) are used to predict the value of the target pixel P1 using the SNN model and then the corresponding residual error RE is added to the P1 to get back the original (ground truth) pixel value. In the second iteration, this predicted pixel (P1+RE1) along with (B2, B3, B4) is used as the new neighborhood quartet to reconstruct the next target pixel P2 as (P2+RE2). Similarly, in the third iteration, the quartet of (B3, B4, B5, P2+RE2) is used to predict the next pixel P3 as (P3+RE3). This sliding window process continues till all pixels of the entire image are generated in a lossless manner resulting in the reconstruction of the full image.

Figures 8A, 8B:
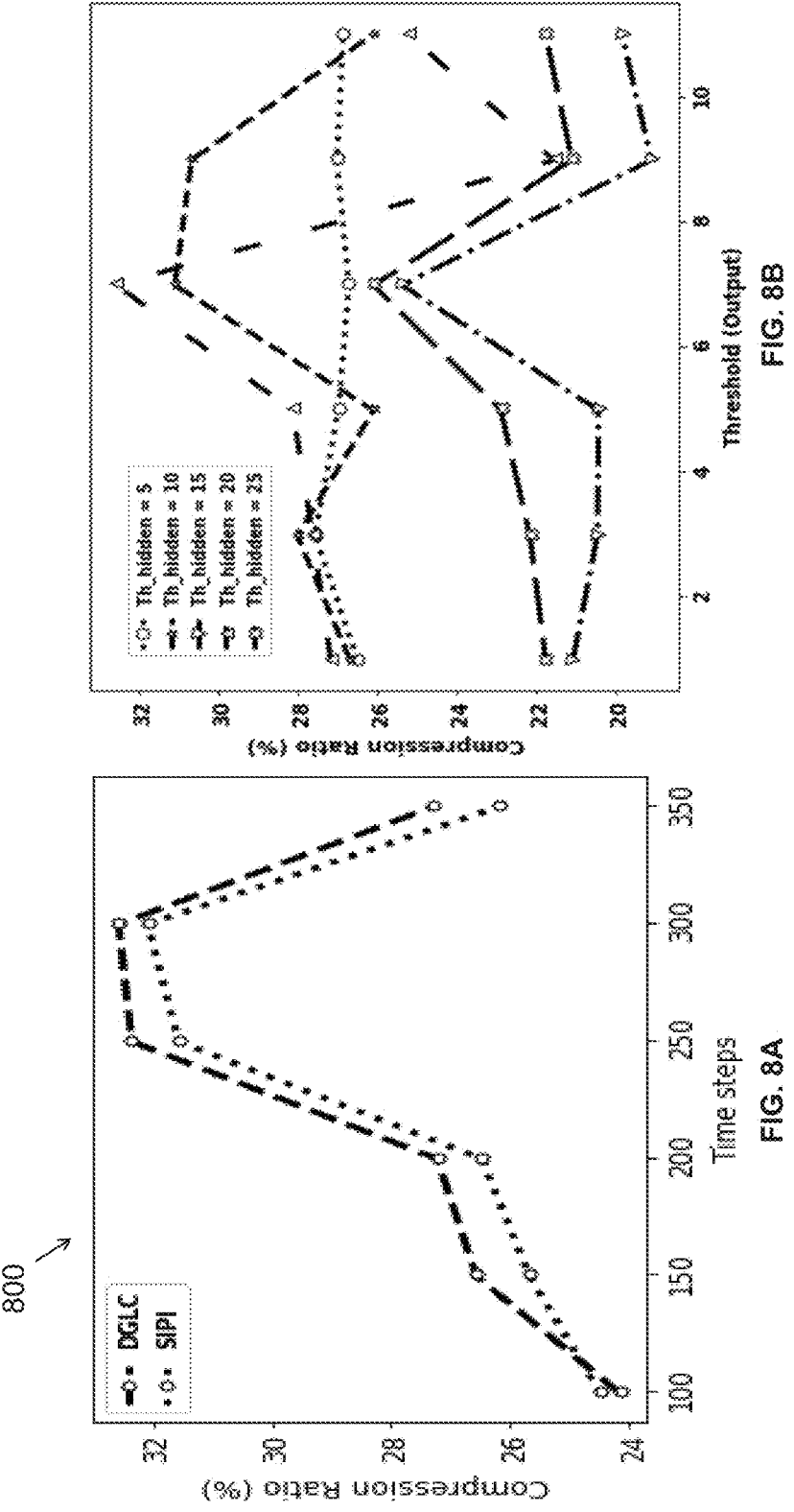
FIGS. 8A, 8B, 8C, and 8D (collectively referred as FIG. 8) are graphical representation to illustrate variation of compression ratio in accordance with some embodiments of the present disclosure.

Experiment:

FIGS. 8A, 8B, 8C, and 8D show variation of compression ratio, in accordance with some embodiments of the present disclosure. FIG. 8A shows the variation of the compression ratio vs. the simulation duration for rate encoding for both DGLC and SIPI datasets. With a fixed simulation duration of 300 timesteps and zero network sparsity, compression ratio varies with respect to changing $Th_{hidden}$ and $th_{output}$. FIG. 8B shows the behavior of the compression ratio when $th_{output}$ is varied in steps of 1, 3, 5, 7, 9, and 11 and $Th_{hidden}$ is fixed at different values such as 5, 10, 15, 20, and 25 with a learnable decay rate of membrane potential. It is observed that for rate encoding network performance is optimal at $th_{output}=7$ and $Th_{hidden}=20$.

Figures 8C, 8D:
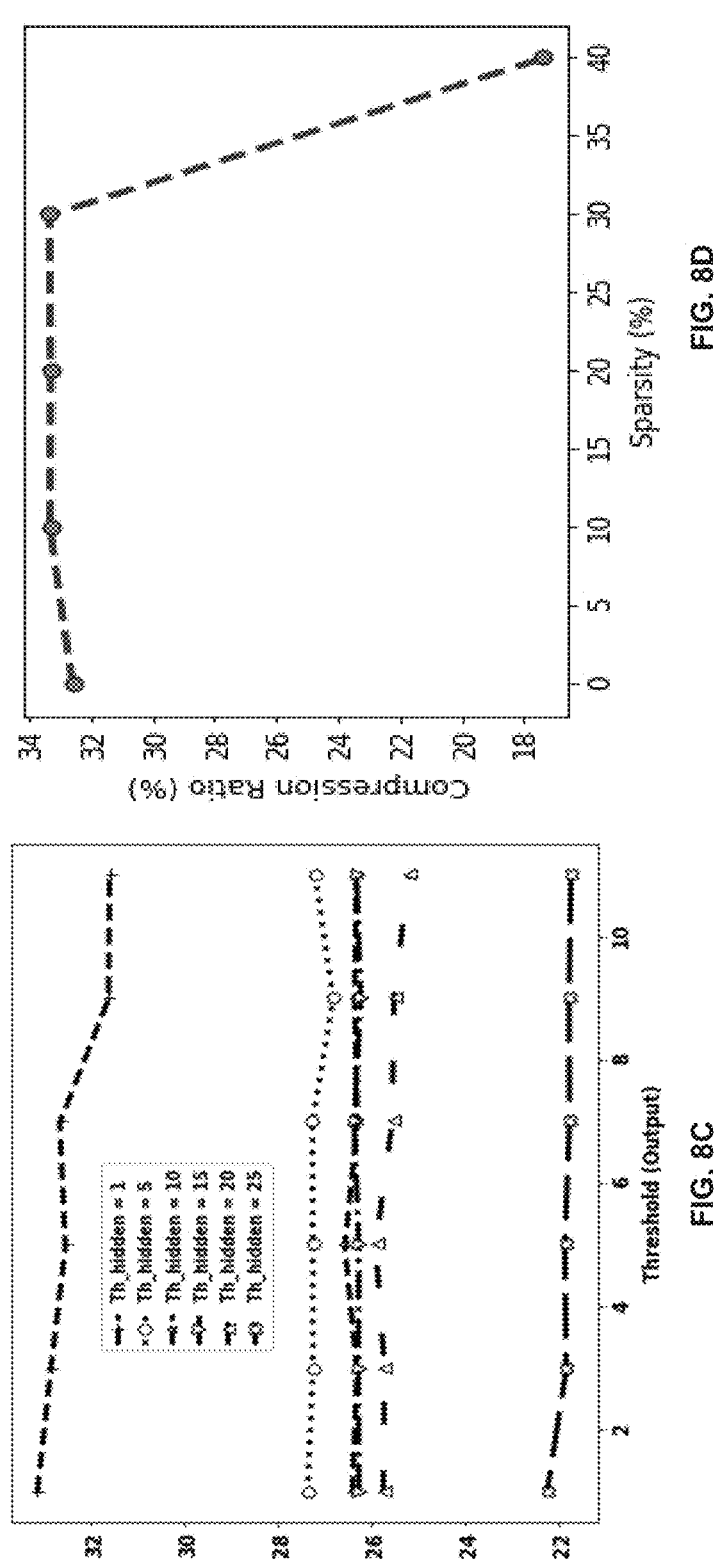

Similarly, FIG. 8C shows the variation of compression ratio with respect to change in $th_{output}$ and $Th_{hidden}$ for direct encoding. An optimal set up is found at $th_{output}=1$ and $Th_{hidden}=1$ with decay rate being learnable here too. It can be concluded that the commission ration is highly sensitive to both $Th_{hidden}$ and $th_{output}$. This is expected since change in $Th_{hidden}$ and $th_{output}$ Of neurons affects the number of spikes in the network and that eventually has an impact on the performance of the SNN. However, the change in performance is not uniform with respect to $Th_{hidden}$ possibly due to the learnable decay rate. The effect of network connectivity sparsity on the compression ratio for rate encoding is observed as shown in FIG. 8D. As the sparsity in the network increases starting from a fully connected network, the compression ratio increases slightly but after a certain value of sparsity it falls drastically which is expected as they network do not have adequate spikes in that case and correspondingly its learning is hampered. Thus, the network sparsity is fixed as 10% for rate encoding.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of reducing earth-bound image volume with an efficient lossless compression technique that is based on a highly energy efficient neural network approach. The embodiment thus provides a method and system for reducing earth-bound image volume with an efficient lossless compression technique that is based on the SNN. Moreover, the embodiments herein further provide a complete lossless compression framework consists of this SNN-based Density Estimator (DE) followed by a classical Arithmetic Encoder (AE). The SNN model is used to obtain residual errors (difference between SNN predicted image pixels and the ground truth image pixels) which are compressed by AE and thereafter transmitted to the receiving station. While reducing the power consumption during transmission by similar percentages, the system also saves in-situ computation power as it uses SNN based density estimator compared to its DNN counterpart. The SNN model has a lower memory footprint compared to a corresponding ANN model and lower latency, which exactly fit the requirement for on-board computation in small satellite.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:

receiving, via an input/output interface, a high-resolution image with one or more channel spectral information as an input, wherein the one or more channel spectral information comprises a plurality of predefined square sized patches;

extracting, via one or more hardware processors, a plurality of neighborhood pixels from each of the plurality of predefined square sized patches associated with the one or more channel spectral information, wherein the plurality of neighborhood pixels associated with each predefined square sized patch comprises a) pixel rows above a center pixel and b) immediate left pixels of the center pixel;

normalizing, via the one or more hardware processors, the extracted plurality of neighborhood pixels based on a predefined range;

encoding, via the one or more hardware processors, values of the received one or more channel spectral information into one or more spike trains after normalizing pixel values for each spectral information channel;

training, via the one or more hardware processors, a Spiking Neural Network (SNN) model using a set of received high resolution images with one or more channel spectral information to predict values of one or more non-boundary pixels of the image from the plurality of neighborhood pixels;

computing, via the one or more hardware processors, a residual error between predicted values of one or more non-boundary pixels of the image by the SNN model and the actual values for each pixel of the plurality of neighborhood pixels;

creating, via the one or more hardware processors, a residual error vector for the received high resolution images by combining the computed residual error for each pixel;

compressing, via the one or more hardware processors, the created residual error vector using a classical Arithmetic Encoder (AE) to send a compressed residual error vector along with a plurality of boundary pixels of the received high resolution images to a receiving station;

predicting, via the one or more hardware processors, one or more missing pixels using the plurality of boundary pixels of the received high resolution images;

decoding, via the one or more hardware processors, the compressed residual error vector using an arithmetic decoder, wherein the decoded compressed residual error vector is added to the predicted one or more missing pixels using the trained SNN to obtain original pixels;

determining, via the one or more hardware processors, a pixel value for a first missing pixel of the predicted one or more missing pixels using the spike trains and the plurality of boundary pixels;

determining, via the one or more hardware processors, the next missing pixel of the one or more missing pixels via the SNN model using the determined pixel value of the first missing pixel, wherein the prediction of next missing pixel continues till each of the one or more missing pixels are predicted; and reconstructing, via the one or more hardware processors, a high- resolution image with one or more channel spectral information by determining the pixel values for each of the one or more missing pixels.

2. The processor-implemented method of claim 1, wherein a SNN based Density Estimator (DE) learns to predict pixels of the plurality of predefined square sized patches of the high-resolution image.

3. The processor-implemented method of claim 1, wherein the classical Arithmetic Encoder (AE) encodes the residual error and sends it as downstream data to the receiving station.

4. The processor-implemented method of claim 1, wherein a compressed message containing the residual errors is decompressed and together with the boundary pixels, a replica SNN model reconstructs the image by predicting the values of each non-boundary pixel.

5. A system, comprising:

an input/output interface to receive a high-resolution image with one or more channel spectral information as an input, wherein the one or more channel spectral information comprising a plurality of predefined square sized patches;

a memory in communication with one or more hardware processors, wherein the one or more hardware processors are configured to execute programmed instructions stored in the memory to:

extract a plurality of neighborhood pixels from each of the plurality of predefined square sized patches associated to each spectral information channel, wherein the plurality of neighborhood pixels is extracted from rows above a center pixel and immediate left pixels of the center pixel in each predefined square sized patch;

normalize the extracted plurality of neighborhood pixels based on a predefined range;

encode values of the received one or more channel spectral information into one or more spike trains after normalizing values for each spectral information channel;

train a Spiking Neural Network (SNN) model using a set of received high resolution images with one or more channel spectral information to predict values of one or more non-boundary pixels of the image from the plurality of neighborhood pixels;

compute a residual error between predicted values of one or more non-boundary pixels of the image by the SNN model and the actual values for each pixel of the plurality of neighborhood pixels;

create a residual error vector for the received high resolution images by combining the computed residual error for each pixel;

compress the created residual error vector using a classical Arithmetic Encoder (AE) to send a compressed residual error vector along with a plurality of boundary pixels of the received high resolution images to a receiving station;

predict one or more missing pixels using the plurality of boundary pixels of the received high resolution images;

decode the compressed residual error vector using an arithmetic decoder, wherein the decoded compressed residual error vector is added to the predicted one or more missing pixels using the trained SNN to obtain original pixels;

determine a pixel value for a first missing pixel of the predicted one or more missing pixels using the spike trains and the plurality of boundary pixels;

determine the next missing pixel of the one or more missing pixels via the SNN model using the determined pixel value of the first missing pixel, wherein the prediction of next missing pixel continues till each of the one or more missing pixels are predicted; and reconstruct a high-resolution image with one or more channel spectral information by determining the pixel values for each of the one or more missing pixels.

6. The system of claim 5, wherein a SNN based Density Estimator (DE) learns to predict the pixels of input image patches.

7. The system of claim 5, wherein the classical Arithmetic Encoder (AE) encodes the residual error and sends it as downstream data to the receiving station.

8. The system of claim 5, wherein a compressed message containing the residual errors is decompressed and together with the boundary pixels, a replica SNN model reconstructs the image by predicting the values of each non-boundary pixel.

9. One or more non-transitory machine-readable information storage mediums comprising one or more instructions which when executed by one or more hardware processors cause:

receiving, via an input/output interface, a high-resolution image with one or more channel spectral information as an input, wherein the one or more channel spectral information comprises a plurality of predefined square sized patches;

extracting a plurality of neighborhood pixels from each of the plurality of predefined square sized patches associated with the one or more channel spectral information, wherein the plurality of neighborhood pixels associated with each predefined square sized patch comprises a) pixel rows above a center pixel and b) immediate left pixels of the center pixel;

normalizing the extracted plurality of neighborhood pixels based on a predefined range;

encoding values of the received one or more channel spectral information into one or more spike trains after normalizing pixel values for each spectral information channel;

training a Spiking Neural Network (SNN) model using a set of received high resolution images with one or more channel spectral information to predict values of one or more non-boundary pixels of the image from the plurality of neighborhood pixels;

computing a residual error between predicted values of one or more non-boundary pixels of the image by the SNN model and the actual values for each pixel of the plurality of neighborhood pixels;

creating a residual error vector for the received high resolution images by combining the computed residual error for each pixel;

compressing the created residual error vector using a classical Arithmetic Encoder (AE) to send a compressed residual error vector along with a plurality of boundary pixels of the received high resolution images to a receiving station;

predicting one or more missing pixels using the plurality of boundary pixels of the received high resolution images;

decoding the compressed residual error vector using an arithmetic decoder, wherein the decoded compressed residual error vector is added to the predicted one or more missing pixels using the trained SNN to obtain original pixels;

determining a pixel value for a first missing pixel of the predicted one or more missing pixels using the spike trains and the plurality of boundary pixels;

determining the next missing pixel of the one or more missing pixels via the SNN model using the determined pixel value of the first missing pixel, wherein the prediction of next missing pixel continues till each of the one or more missing pixels are predicted; and reconstructing a high-resolution image with one or more channel spectral information by determining the pixel values for each of the one or more missing pixels.

10. The one or more non-transitory machine-readable information storage mediums of claim 9, wherein a SNN based Density Estimator (DE) learns to predict pixels of the plurality of predefined square sized patches of the high-resolution image.

11. The one or more non-transitory machine-readable information storage mediums of claim 9, wherein the classical Arithmetic Encoder (AE) encodes the residual error and sends it as downstream data to the receiving station.

12. The one or more non-transitory machine-readable information storage mediums of claim 9, wherein a compressed message containing the residual errors is decompressed and together with the boundary pixels, a replica SNN model reconstructs the image by predicting the values of each non-boundary pixel.

\* \* \* \* \*